Dec. 23, 1952　　　　F. ROCHEFORT　　　　2,622,569
MULTICELLULAR VOLUMETRIC ROTARY MACHINE
Filed July 9, 1947　　　　　　　　　　　　　　6 Sheets-Sheet 1

Inventor:
F. Rochefort,
by E. F. Wenderoth
Atty

Dec. 23, 1952  F. ROCHEFORT  2,622,569
MULTICELLULAR VOLUMETRIC ROTARY MACHINE
Filed July 9, 1947  6 Sheets-Sheet 3

Inventor:
F. Rochefort
By E. F. Osenderoth
Atty

Dec. 23, 1952     F. ROCHEFORT     2,622,569
MULTICELLULAR VOLUMETRIC ROTARY MACHINE Filed July 9, 1947     6 Sheets-Sheet 4

Inventor:
F. Rochefort

Dec. 23, 1952     F. ROCHEFORT     2,622,569
MULTICELLULAR VOLUMETRIC ROTARY MACHINE
Filed July 9, 1947     6 Sheets-Sheet 5

INVENTOR
FRANCOIS ROCHEFORT

BY Wenderoth, Lind & Ponack
ATTORNEYS

Patented Dec. 23, 1952

2,622,569

UNITED STATES PATENT OFFICE 2,622,569

MULTICELLULAR VOLUMETRIC ROTARY MACHINE

François Rochefort, Courbevoie, France

Application July 9, 1947, Serial No. 759,867
In France March 2, 1945

Section 1, Public Law 690, August 8, 1946
Patent expires March 2, 1965

13 Claims. (Cl. 123—16)

My present invention is concerned with multicellular volumetric rotary machines, such as vacuum pumps, compressors and motors.

In the known types of such machines, the blade members or equivalent members may have the following characteristics:

1. They may be directly applied by centrifugal force against the inner wall of the casing called the stator;

2. Or they may be connected to external freely movable mounted rings, or by hinge connections pivoted on a central shaft to dispose said rings or said shaft concentrically with the inner wall of the stator, so as to avoid any friction of the tips of the blades against the stator wall under the effect of centrifugal force exerted on such blades.

3. The blades may be rigidly mounted about a central shaft concentric with the stator so as to avoid any friction of the blades against the stator walls;

4. Furthermore, single bladed or twin bladed rotary machines have been designed and constructed to attempt to suppress the friction exerted under the action of centrifugal force by said blades and to control the variations in the angular speed thereof, to provide a continuous circular movement of both the rotor and blade members, and in certain instances, to effect these movements in two different planes of rotation.

This latter type of apparatus comprises one or two cells and therefore does not make it possible to reach a high volumetric efficiency ratio, nor does it enable a sufficient tightness against the pressure fluid to be maintained. Such machines are generally used as ventilators for very low pressures (blowers).

In the above described known machines, the movable parts, i. e. the blades, the sealing or guiding blocks, the rocker shafts, etc., offer large frictional surface areas and require the movement of large masses at high amplitudes, whereby excessively large inertia and friction effects are created to lead to a low mechanical efficiency in such machines.

The present invention has for its object improvement of the foregoing defects n the construction and to overcome the undesirable inertia and friction effects by reducing the amplitude of the movement of the parts of the apparatus to improve the efficiency thereof.

A further object of the invention is to provide in a rotary volumetric machine, the combination comprising a rotor constituted by the rigid assemblage of a central partially spherical core, of a shaft going through said core, of more than two radial blades with curved edges concentric with said core, and of frusto-conical flanges on the side of said core, a stator enclosing said rotor in fluid tight relation, a rotating annular oblique partition in fluid tight contact with said core dividing said stator into two compartments, guiding means for the periphery of said partition in said stator, openings through the same partition with fluid tight pivoting elements for the passage of said blades, said pivoting fluid tight elements being pivoted in members which are rigidly bound to said partition only for two of the blades, which are situated on the same diameter of said rotor, but are angularly movable to and fro up to a predetermined extent about the center of said partition, and inlet and outlet passages for a fluid for each compartment of the stator.

In the machine of the invention, the rotor comprises a core with a spherical surface centered on the axis of rotation and provided with side flanges; the space defined by the core and the flanges thereof is subdivided into cells by radially extending blades, the free edges of which are of arcuate form concentric with said core. The entire assembly is housed, with the minimum amount of clearance as is consistent with rotation and a tight seal, in a stator structure having a complementary internal form. Said stator has freely mounted therein an inclined annular partition in which there are formed passages for the blades, said passages being tightly sealed by means of movable elements. Said passages make it possible for the partition to extend as far as the core so as to divide into two compartments each of the rotor cells and be driven by said rotor.

As a result of the above, the respective capacities of both compartments in each cell are varied reversely with respect to each other, each one successively passing through a maximum and a minimum value at each revolution.

The accompanying drawings illustrate by way of example one of the applications of the invention, i. e. a multicellular rotary internal combustion engine, in two different embodiments.

Figs. 4, 5 and 6 relate to the blades.

Fig. 10 shows a modified construction for the stator and the movable partition and the friction disks.

The various machines of the invention comprise the following common members.

1. An outer casing forming the stator 15 the internal contour of which is strictly spherical; said casing being formed in two sections respectively centered by the foremost closure flange fitting plugs 16 and the rearmost closure flange fitting plugs 17, and both said sections being assembled along a longitudinal axial plane parallel with the shaft and being blocked with screws 18 and bolts 19. In machines adapted to operate at high pressures, the plane of assembly may be disposed at a right angle with respect to the axis of the high pressure and the high temperature zones so as to avoid the possibility of any undesirable leakage through the assembly joint. Moreover the stator comprises a flow chamber for the cooling liquid or cooling fins for air cooling.

Figures 10, 11:
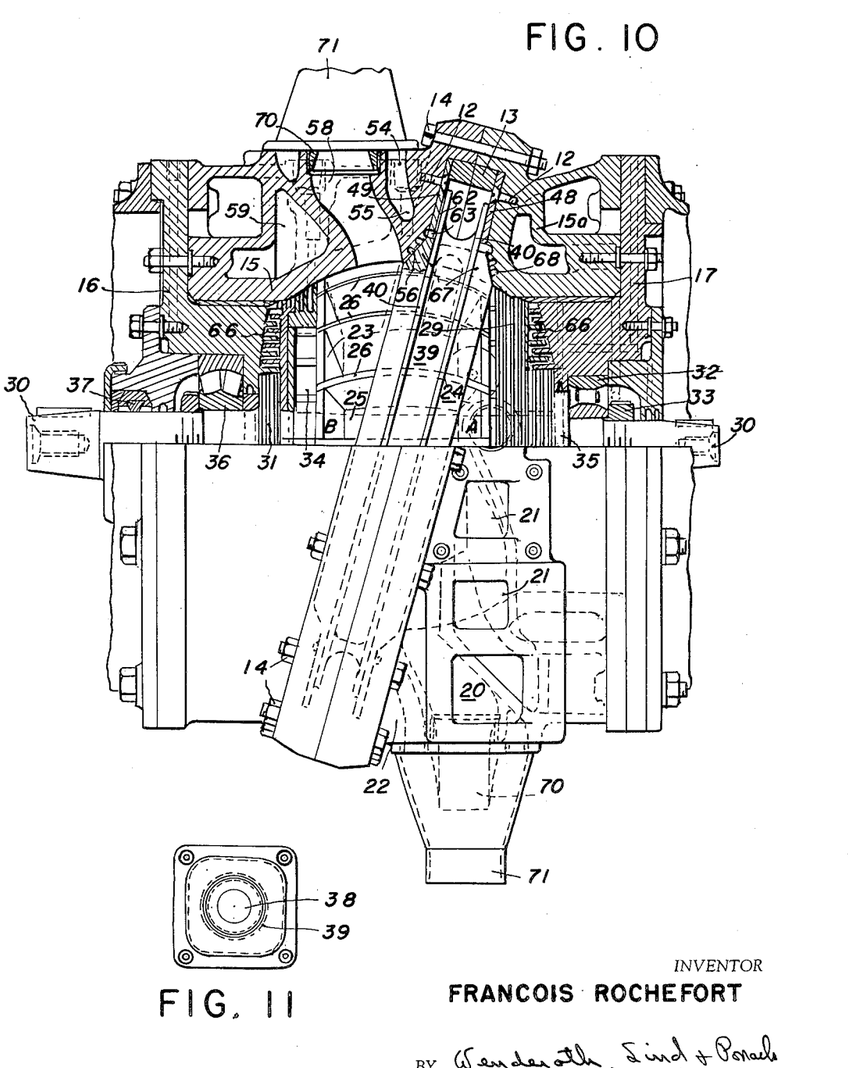
Fig. 11 is an end view of an exhaust nozzle.

In the modified construction shown in Fig. 10, the stator is formed by two shells 15 and 15a of circular shape carrying an inclined surface for their mutual assembly, the plane of the joint passing through the axis of the movable partition housing; both said shells are reciprocally centered with respect to each other, by means of an internal annulus 13 accurately adjusted within recesses provided in the shells 15, 15a which are maintained in blocked condition by a set of bolts 14 uniformly spaced on the periphery of the stator structure.

In the case of compressors or vacuum pumps, there is formed on each of the sections comprising the stator, an intake opening into an intake chamber and an outlet corresponding to the respective compartments.

Figure 7:
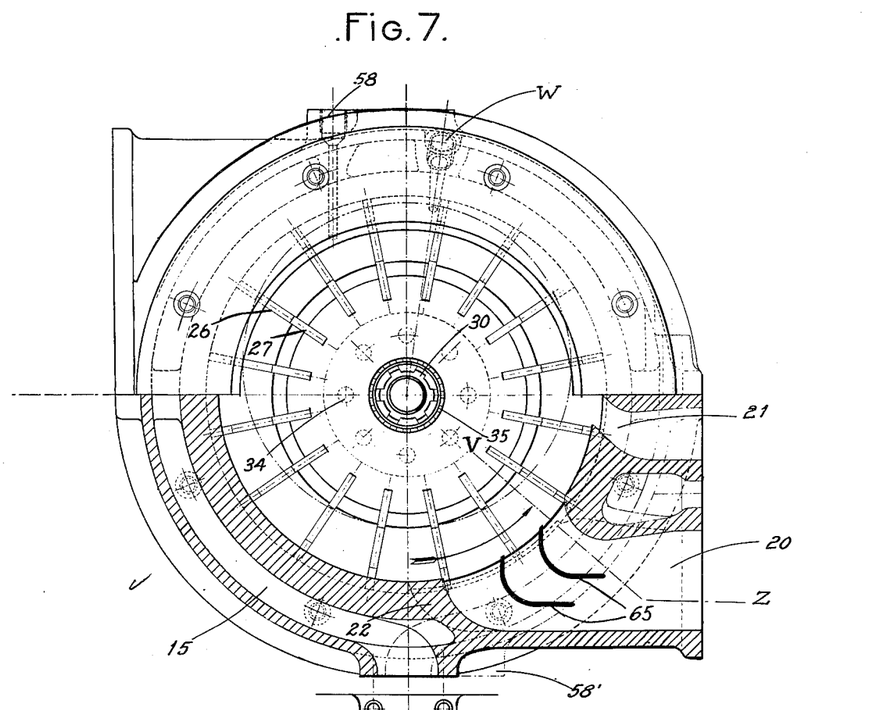
Fig. 7 is a half section on line XY of Fig. 1.
Figure 9:
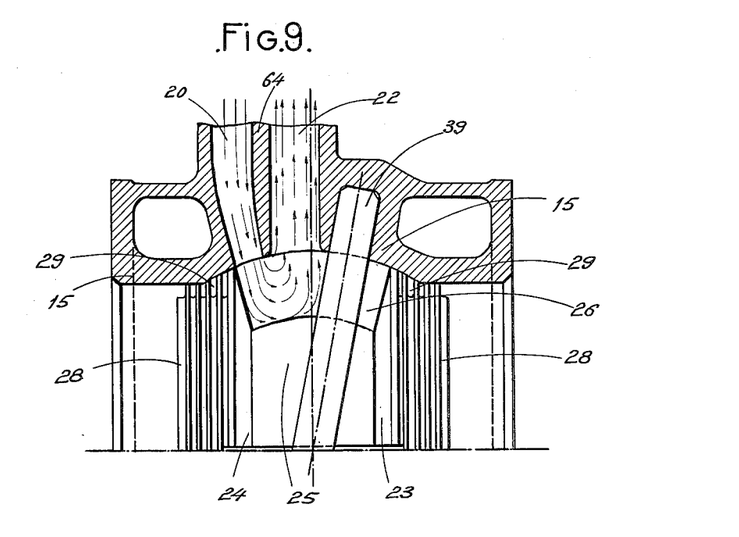
Fig. 9 shows a cross section on line VZ of Fig. 7.
Figure 12:
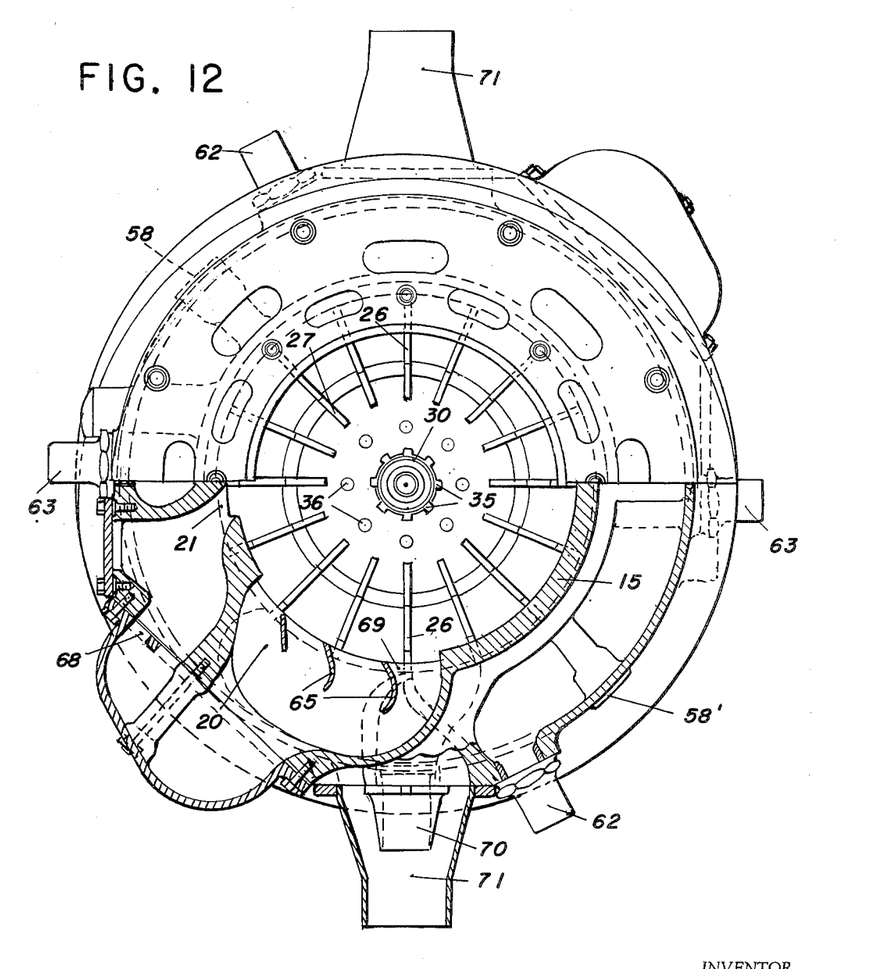
Fig. 12 indicates the mounting of the exhaust nozzles and the partition ring deflectors of baffle members in transverse cross section.

In the case of an internal combustion engine, each stator section includes: a low pressure air intake port 20 for scavenging and feeding the cells, an intake port 21 for the charging air or the carburized mixture at a controlled variable pressure and another port 22 for the exhaust of the burnt gases after expansion. In Figs. 7 and 12 the discharge outlet has been shown in dotted lines below the scavenging port. The scavenging air intake chamber and the gas exhaust chamber are separated by a partition 64 (Fig. 9).

2. A rotor is formed by two cone frustrums 23—24 oppositely disposed to each other by their smaller base, spaced and maintained at a constant spacing with respect to each other by a truncated spherical core member 25. These three parts thus assembled have radially formed grooves in which are mounted and carefully adjusted blades 26 the external contour of which is arcuate, corresponding to the contour of the stator 15 within which they rotate, the clearance therebetween being as small as possible. The blades 26 at each end are provided with a retaining projection 27.

Two flanges 28 accurately adjusted and provided with annular expansion channels 29 are adapted to maintain the blades through the retaining projections thereof, which are firmly applied against the bottom of the fitting grooves of the rotor.

The cone frustums 23—24, the core member 25, the blades 26 and the pair of plates 28 are maintained in perfectly centered and blocked relation on a central driving shaft 30, between a shoulder 31 of said shaft and the rearmost antifriction bearing 32, by means of a blocking nut 33. The frustums 23—24 are driven by spindles 34 extending through the plates 28 and the supporting and the driving shoulder 31 at the forward end; the rearmost flange 28 is secured by splines or driving keys 35 provided on the shaft 30.

The rotor thus formed constitutes a rigid and balanced unit which is accurately centered within the stator 15 and maintained in position by the foremost anti-friction thrust bearing 36.

In a machine adapted to operate at high pressure, the seal is improved by providing labyrinth means 66 (Fig. 10) in cascade formation and in a sufficient number throughout the periphery and the faces of the plate 28, as conventionally used with steam turbines, instead of the annular expansion channels as above. The tips of the blades 26 extend through one or more expansion channels 29 (Fig. 1) thus forming centrifugal turbines, to produce a "packing" of air or gases against the inner stator wall, and to retard any flow of gas axially of the rotor.

Packing means 37 and annular means 38 provide a tight seal at the outlet of the drive shaft 30 and against the closure flanges 28 which, in compressors and vacuum pumps, ensures an absolutely positive seal, at the end opposite to the control or driving end of the machine.

Figure 1:
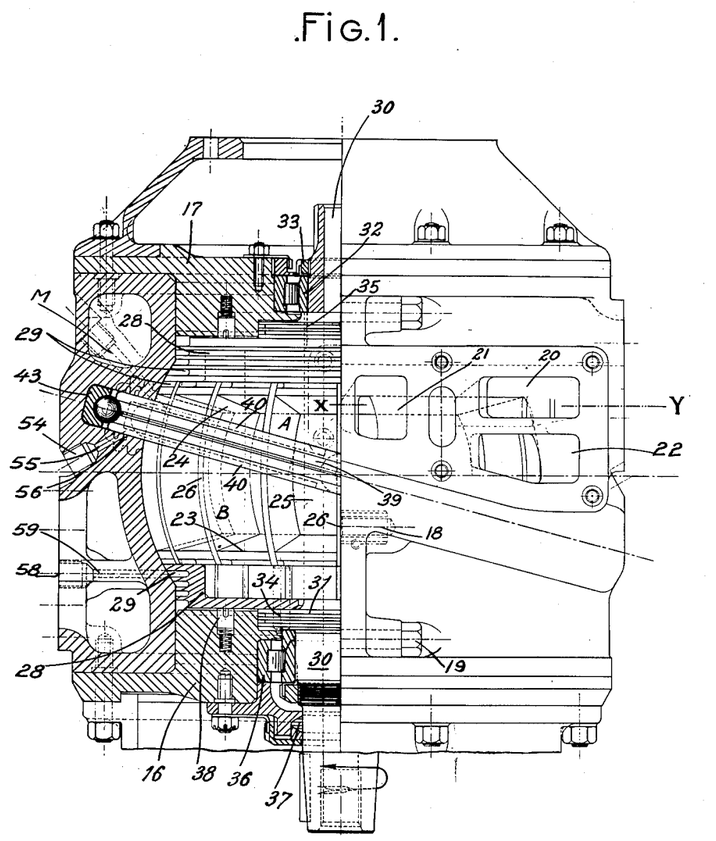
Figs. 1 and 10 show on one side a longitudinal axial cross section of the machine and on the other side an external elevational view thereof.

3. A lightweight, hollow, movable annular partition 39 is obliquely mounted in the stator body 15, in a compressor or a vacuum pump, rotated tangentially to the surface of the pair of cone frustums 23—24, with the minimum possible clearance, and, in the case of an internal combustion engine, is rotated in a plane parallel to and at a predetermined spacing from the surfaces of said cones, in accordance with the selected compression ratio (Fig. 1).

Figure 3:
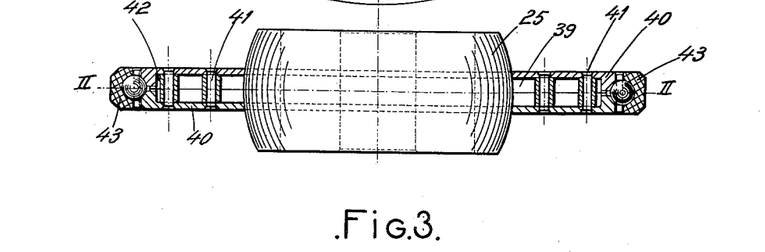
Figure 4:
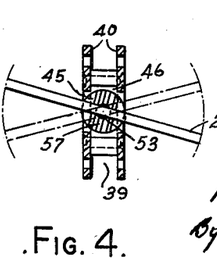
Figs. 4 and 5 illustrate the end positions of the blades and the related sealing members.
Figure 5:
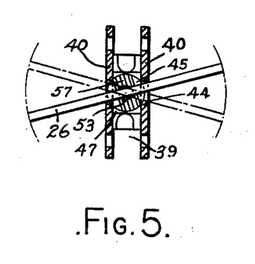

The annular partition 39 subdivides the body of the machine into two independent compartments (A and B), forming two separate cellular chambers in the same machine. This feature provides in a single machine two successive stages of compression. The effective compression is suitably delayed in that compartment which is operated at the higher pressure. Both cellular compartments are initially similarly supplied, through a charging aperture disposed at an appropriate location, the highly cooled compressed air supplied by the compartment of the first stage is introduced and then, after the charging aperture has been isolated by a blade, the total charge is compressed to the desired pressure value. It is also possible if desired to compress within a single apparatus two gaseous fluids of different compositions: such as pure air and carburized air, or pure air and combustible gas, and the like, in the case of feeding compressors or superchargers for internal combustion engines. The annular partition 39 is formed by two flanges 40 (Fig. 3) assembled together through rivets 41 or screws, with interposed spacers 42 to maintain both flanges in parallel spaced relation. Said annular partition 39 is adapted to rock with a smooth friction fit on a central rotula or ball-and-socket mounting means formed by the spherical core 25 of the rotor. To provide for a tight seal towards the center of the machine, it is rotated on an annular run-way 43 provided with ball or rollers. Said runway is concentric with the central rotula 25 and is tightly clamped in the housing provided therefor in the body of the stator 15. This arrangement is operative to center the annular partition 39 to avoid any substantial lateral friction of said partition against the stator wall.

In the modified embodiment shown in Fig. 10, both flanges of the movable inclined partition 39 are outwardly extended by a circular web for the movable partition to bear against either one of the friction disks 48 or 49 between which it rotates with a very small clearance.

Said friction disks 48 and 49 are formed from a material having a very low friction coefficient at high temperatures (such as highly graphitized cast iron or any other suitable alloy) and presenting self-lubricating surfaces; the disks are centered and rigidly secured to the inner faces of the stator cells 15 and 15a with uniformly spaced screws 12.

A clearance or recess 62 (Figs. 10 and 12) is formed on the external surface of each friction disc, extending through a predetermined arc section; said recess is continuously supplied with high pressure air, to balance the lateral thrust exerted on the opposite face of the movable partition, through the average gas pressure in the operating or driving cells.

The recess in one disc is displaced through 180° with respect to the recess of the other disc, inasmuch as the operative zones themselves are displaced through 180° in both cellular compartments of the machine.

Two circular grooves 63, permanently charged with compressed air, provide for a constant supply to both recesses 62.

Figure 13:
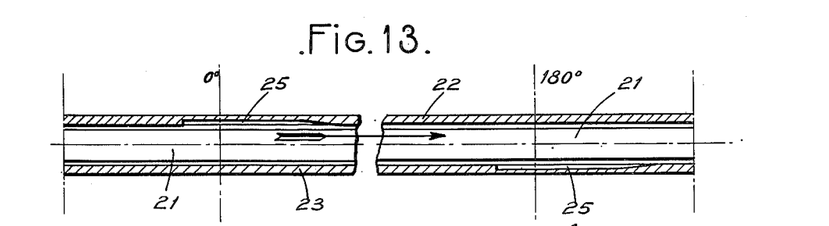
Fig. 13 shows in developed view the recesses formed in the friction disks.

Fig. 13 shows in developed view the shape of the clearance or recess 62 formed on each of the friction discs.

In the direction of rotation of the movable partition 39, said recesses end in a very acute angle, so as to facilitate the formation of a film of compressed air continuously maintained and carried along by the walls of the movable discs, by a continuous and rapid rotation; this film of compressed air prevents any direct contact between the metallic surfaces in a stable operating condition of the machine, and thus substantially reduces the amount of energy losses due to friction.

For any sudden variation in the load, the gyroscopic action of the mass of the movable partition is effective to maintain stability therein, the machine preferably operating at a constant rate regardless of variations in the load.

In order to isolate the internal wall of the stator from the gases at high pressure and temperature, upon ignition thereof in the cells, each of the flanges of the movable partition 39 is enlarged towards the interior of the stator by means of a circular aileron member 67, the internal spherical contour of which accurately extends the contour of the stator as far as the planar face of the movable partition, so that the conical plates 23 and 24 may penetrate into the movable partition rotated parallel therewith.

In this manner, the final compression and ignition chambers are included between the walls rotated in parallel relation, thereby preventing any projection of high temperature gases against the stator wall before and during the relatively short explosive combustion (both in time duration and in space).

The fixed stator wall is only uncovered after the rotor has rotated through an angle of preferably at least 50°, after spontaneous and total ignition of the explosive mixture.

The combustion gases come into contact with the stator wall only after they have been subjected to a substantial temperature drop and are relatively quiescent; said wall is therefore protected from the shock of the explosion and from the excessively rapid projection of burning gases producing a blow-pipe effect; its internal surface is therefore not liable to be destroyed.

The walls of the cells at each revolution of the rotor passing in the scavenging and cooling zone, the distribution of heat is more uniform and regular both for the rotor and the stator.

Expansion grooves or channels 56 formed in the stator wall opposite to the ailerons 67 are supplied with high pressure air to prevent the penetration of high temperature gases into the housing of the movable partition.

Openings 44 formed in the annular partition 39 make it possible for the blades 26 to be relatively angularly displaced with respect to said partition. Such displacement is a result of the inclination of the partition with respect to the axis of rotation. Reciprocable joints 45 mounted on stationary blocks 46 or on light-weight movable blocks 47 provide for a gas tight seal as the blades pass through the disk for any position said blades may assume. The movable blocks 47 are at all times applied against the internal face of the partition ring by centrifugal force.

The annular partition 39 is positively and smoothly driven by two reinforced blades oppositely disposed to each other acting through the medium of a pair of reinforced reciprocating joints on the fixed blocks 46 riveted to the partition walls or blocked between the flanges thereof by means of screws.

The blocks as well as all of the reciprocating joints are accurately adjusted on the central spherical ball member 25 to ensure a tight seal.

Lubrication in the apparatus is effected as follows: The lubricant is introduced by any suitable means and conveyed under pressure to the runway 43. The annular partition, the blocks and the rocking joints are formed with radially drilled ducts 50—51 and 52, whereby the lubricant may penetrate under pressure into the interior of the reciprocating joints which in turn, as a result of their rocking motion, ensure lubrication throughout the entire surface of the blades 26 and the central ball member 25.

In high pressure compressors, vacuum pumps or engines, wherein the presence of any amount of oil or oil vapour in the discharged fluid or in the operating chambers would be objectionable or dangerous, the blocks 46—47 as well as the rocking joints 45 are formed in metal graphitized under very high pressure according to known methods to provide self lubricating members. Centrifugal force maintains a suitable lubricant which may be adduced in any suitable manner, on the runway 43.

In low pressure compressors, or low vacuum pumps, the machine may include as little as eight blades. For high pressure compressors high vacuum pumps and engines (as indicated by way of examples in Figs. 1 and 7) the rotors may comprise as many as 16 blades or more. The rotors in this case are formed with larger diameters.

For machines operating at low pressure, the angle of inclination of the annular partition should at no time exceed 30°. For machines adapted to operate at high pressure, said angle should be further reduced. It may be brought down to as little as 15° or less according to requirements, to reduce the amplitude of the displacement of the movable blocks and the reciprocating joints, because the unitary loads are higher in such a case.

To increase the number of dividing cells formed between the blades, and increase the efficiency of the seal against the pressure fluid, to enhance the efficiency of the machine, large diameter rotors are used, while at the same time the ratio of the diameter of the stator to that of the central ball member is reduced thus limiting, to a lower value the strain in the blades and the movable parts: e. g. the blocks and reciprocating joints.

In machines operating at high pressure and comprising self lubricating members, to avoid any discharge of compressed high temperature fluid outwardly of the operating chambers, there is provided a circulation of compressed air (preliminarily cooled) at a suitable pressure, in excess of the average pressure and close to the maximum effective pressure prevailing in the operative chambers of the machine, to ensure a sufficiently tight seal. The compressed air required therefore is supplied by a small auxiliary two stage compressor, driven from the machine itself. Any leakages of compressed air are to a great extent recovered in the operative cells of the engine.

Figures 1, 4, 5, 7, 10, 11 and 12 illustrate the various circulation channels. The compressed air arrives through pipes connected at 54 and the conduit 55, and is conveyed to the runway 43 through the external sealing grooves 56, provided in sufficient number at each side of the housing in which the annular partition 39 is fitted into the stator walls, and through the conduits 50—51—52—53 and 57 above and below the blocks and reciprocating joints, into contact with the central spherical ball member 25. Also, to ensure a suitably tight seal at both ends of the rotor, the compressed air arriving at 58 and 58' is conveyed through conduits 59 towards the second of the sealing and expansion grooves or channels 29 formed in the plates 28.

The masses subjected to varied movements, and the amplitude of such movements, are reduced to a minimum value as also are the surface areas subjected to friction, and through the use of a larger number of cells a tight seal at high pressures may be adequately maintained (the ratio between the pressure values prevailing in two adjacent cells being smaller as the number of said cells is increased).

This type of machine being particularly designed to operate at high speed, the pressure variations in the cells are excessively rapid, which further improves the sealing conditions.

Figure 2:
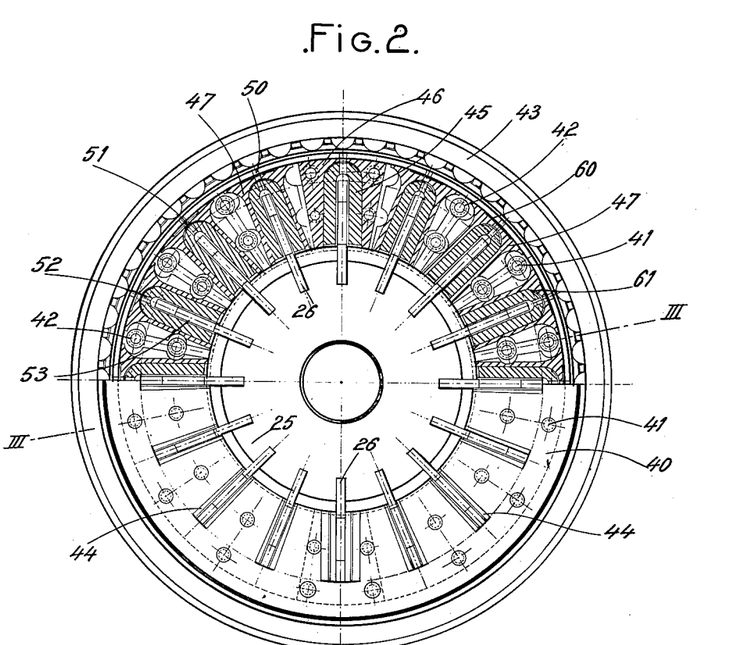
Figs. 2 and 3 show the annular partition, respectively in elevation with a partial cross section on line II—II of Fig. 3 and in axial cross section on line III—III of Fig. 2.

To provide a satisfactory tight seal, against the central ball member 25, clearances 60—61 are provided as shown in Fig. 2, firstly on the external surface of the movable blocks and secondly at the external ends of the reciprocating joints, to make use of the pressure of the circulating compressed air to compensate for the centrifugal action exerted on the masses of both members, and to ensure a perfect contact under low pressure against the surface of the central spherical ball member 25, the sectional areas of the clearances being appropriately adjusted. By this means, the central leakages which could result from wear at the tips of the reciprocating joint blocks are averted.

The operation of the above described mechanism is readily understood. If the rotor is rotated in the direction indicated by the arrows in Figs. 1 and 7, the position of the annular partition 39 remains stationary since it is rotated around its center and in its own plane. During rotation, the blades slide through the partition 39, the volume of each cell successively varies between two end limiting values for each revolution of the rotor in each of both separate cellular compartments, because of the periodic movement relative to the side walls of the partition 39 and the inclined surfaces of the cone frustums 24—24. The eccentered circumference indicated in chain dotted lines in Fig. 7 at the location of the blades, diagrammatically indicates the variation in the volume of the cells, which variation is effected longitudinally of the rotor (in a plane perpendicular to the plane of the figure).

The internal combustion engine of the example is associated with the following auxiliary devices which have not been shown in the drawings:

1. A blower turbine, of either helical or centrifugal type, supplying scavenging and primary combustion air with a large rate of flow, low pressure and low temperature, to ensure scavenging of the burnt gases and a vigorous cooling of the operating chamber walls.

2. A charging compressor of a rotary volumetric type at low pressure and with adjustable output and adjustable discharge temperature, regulating the final intake pressure and temperature for the engine. This apparatus may supply pure air and fuel is then introduced into the compression cells of the engine and at the desired point (after having isolated the charging port with the blades), by known methods, such as pneumatic or mechanical injection or said compressor may supply pure air on one side and on the other side a rich carburized mixture of a combustible gas or a rich mixture of air and pulverized fuel, such as pulverized coal or combustible flour.

The charging compressor is supplied with air under pressure through a take off from the discharge of the scavenging pump. The air supplied thereby is compressed in two stages and cooled to the desired temperature before entering into the biasing and charging manifold or collector. The discharge temperature is controlled by an ultrasensitive thermostat acting on the cooling circuit of the compressor and the air or charging gas.

3. A small volumetric high pressure, two stage, rotary compressor having an adjustable output, may supply the compressed air necessary to ensure the tight seal for the annular partition and the rotor.

The first stage of this small sealing compressor is fed through a take-off from the charging compressor air discharge. The air compressed by the sealing compressor is subjected to three successive compression stages and vigorously cooled during and after each compression stage before entering the elements of the engine to cause, through expansion thereof, said members to be cooled.

4. A volumetric fuel supply pump with adjustable output (metering pump) of a carburetor or a pulverized fuel distributor may be added according to requirements.

5. Two electric ignition means arranged in W formation may be added to provide an accurate ignition point in the cycle (preferably by incandescent ignition) in each of the cellular compartments A and B.

The auxiliary apparatus described above are positively driven from the engine and do not require any relative setting because the output is continuous.

As previously indicated, the engine includes:

1. A scavenging port 20 at all times communicating with the fresh scavenging and combustion air collector manifold, which air is supplied at a low pressure through a suitable scavenging turbine. The scavenging air conduit is inwardly partitioned by distributor blades 65, to avoid a retarding action on the rotor during induction of the air and to recover, through the action of the air projected against the rapidly rotating blades, a portion of the energy used for driving the scavenging turbine.

2. A charging aperture 21 at all times communicating with the charging pressure biasing collector and in communication with the scavenging air collector. Both collectors are interconnected through a conduit the section of which is adjustable by means of a suitable valve 63 shown in Fig. 12 of the drawings, whereby it is possible at any instant to adjust the cross sectional area of the interconnecting channel or to tightly seal said collectors from each other.

Said interconnecting valve may be operated automatically (in the same manner as the induction limiting devices as used in aircraft engines) through the agency of a servo-motor controlled by the slide valve plunger of a manometric capsule maintained and biased by an adjustably-tensioned spring. Said manometric capsule controls and maintains at a desired value the pressure in the charge collector.

Any pressure variations in the charging collector automatically causes a corresponding variation in the final induction pressure and therefore in the final compression pressure in the cells of the engine. The effective compression ratio in the operative cells starts when the volume of the individual cells has been reduced by one-half, about 90 degrees before the point when the volume of said cell is a minimum.

In stable operation, all the cells are successively charged with pure air or carburized gas at a uniform pressure, and supplied from the same source, the direction of flow of the charge being uniform for all the cells successively passing through a given point during the rotation of the rotor. For those reasons, there is obtained a compression ratio of uniform value successively in each of the cells.

The minimum volume for each cell is determined, at the point where they are closest together, by the spacing from the side surface of the angular wall 39 to the surface of the cone frustums 23—24. This volume is calculated by being based on half the maximum volume generated by the cell, that is the volume existing in the cell 90° before said cell passes through its end-of-compression position.

The minimum rate of compression is selected so as to permit the use of those fuels which are most sensitive to detonation, the compression between cells varying as a function of the final admission pressure (charging pressure), and as a function of the temperature. The charging pressure and temperature are adjusted for the best use of the fuel employed.

A rapid rate of combustion is obtained while achieving a very complete combustion, and a high thermal efficiency without damage to the mechanical elements, based on the following:

1. The positive control of the final compression temperature and pressure values permits adjustment to the values necessary to obtain a spontaneous ignition of the charge.

2. The reduction in the necessary amount of gas spontaneously ignited is permitted as a result of the high state of subdivision of the detonating charge mixture. The subdivision into cells causes a very small fraction of said charge to enter into combustion, and successively cell by cell. In the engine described by way of example, said charge, for one revolution of the rotor, is divided and distributed into 32 cells, 16 for each cellular compartment.

3. The effective final compression ratio is adjusted by the final intake temperature and pressure, so as not to reach the temperature of spontaneous ignition of the charge (detonation) before the point where the minimum voltage is reached for each cell successively; at that moment, the surface of the blades subjected to the explosion wave is very small, whereby the blades are subjected without any danger to the small shock produced by the spontaneous ignition of a very small body of gas.

The igniter comes into action for very high charges to control the point at which the compressed charge enters into combustion. Its action is more useful in the operation of the engine at very low charges because the final compression temperature is lower.

In the engine shown, to obtain good heat distribution throughout the mass of the stator, combustion is simultaneously effected in two diametrically opposed cells, one in each cellular compartment on both sides of the annular partition 39. For high power engines, the number of cells may be greatly increased.

Figures 6, 8:
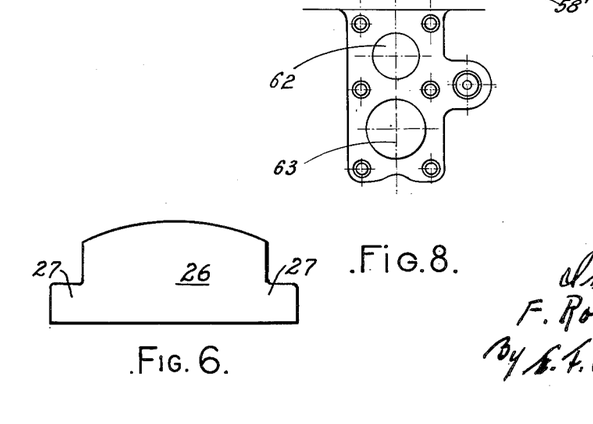
Fig. 6 shows a plan view of a blade.
Fig. 8 shows in plan view a detail of the foregoing figure.

In order to further regulate the temperature throughout the stator body, the flow chamber for the cooling liquid is divided into two compartments separated from each other so as to produce identical cooling conditions for both cellular chambers. Both the combustion and expansion zones in said chambers being displaced with respect to each other through 180°, the inlet 62 and outlet 63 (Figs. 7 and 8) for the cooling liquid in each circuit are displaced by the same angle with respect to the inlet and outlet of the other circuit.

In the case of a compressed air engine or a steam engine, the foregoing arrangement is followed for circulating hot air or steam.

*Operation of the engine.*—Consider a cell after discharge of the burnt gases therefrom, and fully in the scavenging phase. The violent current of boost pressure fresh air scavenging the cells cools the sides of the blades, the cone surfaces and the annular partition, as shown in Fig. 9. The scavenging phase proceeds until the rearmost blade of the same cell (as viewed in the direction of rotation of the rotor) first cuts off communication between said cell and the outlet, then cuts off communication with the scavenging aperture, and substantially throughout 80° of the rotation of the rotor. When said cell becomes isolated from the scavenging port, it is charged with fresh air at the pressure of the scavenging collector manifold.

A neutral or dead period only lasting a few degrees and corresponding to no more than the thickness of a blade, prevents any communication, through the cell, between the charging collector and the scavenging collector.

When both the charging air and scavenging air collectors are maintained permanently in communication (the throttle 68 being fully opened), both collectors are charged at the same static pressure and the charging air compressor is not operative to supply the engine. The rotor continuing its movement of rotation, the foremost blade of the cell uncovers the charging aperture and establishes communication from the cell to said aperture. During this time, the volume of the cell decreases rapidly. Said cell discharges into the charging collector a part of the body of air which it has received from the scavenging collector, until the point where its rearmost blade will in turn seal the charging aperture (substantially 90° before the end of compression, in the cell under consideration). At that instant, the cell, the volume generated of which has been reduced by half, is charged to the pressure prevailing in the charging collector which in turn is charged to the same static pressure as the scavenging collector, as just described.

The effective compression period in the considered cells therefore lasts through about 90° of the rotor revolution. As soon as any communication with the charging collector is cut off, the fuel is injected from a spray nozzle, not shown, under pressure, to diffuse in the cell, the charging of fuel into the cell being done by mechanical injection, by air injection or by gas injection.

The rapid formation of a homogeneous carburized mixture is therefore accomplished during the compression phase. The charge of detonating mixture necessary for combustion and the formation of which is entirely completed within the cell itself. A violent swirl may be obtained through pneumatic injection to allow the necessary rapid diffusion of the injected fuel.

The compression being continued, the compression temperature vaporizes the liquid fuel to facilitate the diffusion of the vapours throughout the volume in the cell. In this way there is very rapidly produced a perfectly homogeneous charge mixture.

The injection operates continuously, the cells being presented in sequence in front of the spray injection means, to provide an excellent advantage in obtaining the fine adjustment which is essential for efficient atomizing and rapid diffusion of the charge of fuel throughout the volume of each successive cell.

The cell at the final compression stage thereof, at the point for ignition of the charge, the foremost blade uncovers the ignition means at W, the inner end of said means being heated to a high temperature by an electric current (incandescent ignition). In normal operation, the temperature of the igniter is maintained by the heat generated by combustion, at a value amply sufficient to properly insure accuracy in the ignition of the homogeneous charge at the desired point. This charge itself is at a temperature very close approximating that which is necessary to produce spontaneous firing of the mixture, close to the point where the minimum voltage is attained in the cell considered. In normal operation, the electric current may be cut off, since its action is only necessary to facilitate starting of the engine at a very low temperature.

The power expansion of the combustion gases is extended as far as possible. It lasts through 180° of the rotor revolution, the exhaust ports only being uncovered when the cell is at the end of the expansion period, when the volume generated thereby approximates a maximum.

At the end of the expansion period, the exhaust ports are uncovered by the foremost blade of the larger cell. The residual gases, partially expanded but still under pressure rush into the exhaust conduit. When the internal pressure in the cell has dropped to a value slightly lower than the pressure of the scavenging air, the scavenging ports are uncovered in turn, and the fresh air under high pressure, as supplied by the scavenging turbine expels the residual burnt gases and through its expansion violently cools the walls subjected to the contact of the scavenging air stream, which cooling is vigorously maintained until closure of the exhaust ports. The impetus of the stream of fresh scavenging air continues the cooling action by maintaining a swirl in the cell until closure of the scavenging ports. The complete cycle is accomplished in one rotor revolution, that is in 360°.

The burnt gases are discharged into an exhaust nozzle so as to obtain a smoother flow in the exhaust manifold, and improve the efficiency of the scavenging action, the cooling action and also the mechanical efficiency of the engine.

For that purpose, the exhaust phase of the burnt gases is subdivided into two portions; the first part of the exhaust ports in the stator are partitioned as shown in Fig. 12 by means of a deflector or baffle member 69 adapted to direct the blast of burnt gases (at the time where the exhaust ports are open) into an appropriate nozzle 70 centered rearwardly of the throat section of a Venturi tube 71; this assembly forms a suction tube or aspirator to use the kinetic energy of the expanded gases for suction in the exhaust chamber so as to accelerate the flow of scavenging air which projects into the cells located opposite to the scavenging ports 20, which ports are supplied in fresh air under pressure from a scavenging turbine.

The burnt gases with a certain amount of scavenging and cooling air are discharged by the diametrically opposed exhaust suction nozzles, of which there is one for each cellular compartment.

The setting angles of the phases of the cycle, namely:

Exhaust opening lead
Scavenging opening lag
Exhaust closure lead
Scavenging closure lag are determined as a function of the rates of rotation selected in the operation of the engine.

The final (minimum) volume of the compression chamber is determined by the spacing from the side surfaces of the annular partition 39 to the side walls of the conical frustums 23—24, at the time where both of those elements are closest together. The volume of this chamber is calculated as half the greatest volume generated in the cell, to obtain a minimum volumetric compression ratio such that, in normal operation, the temperature of continuous ignition in the charge of detonating mixture compressed in the considered cell is obtained at the point which substantially corresponds to the minimum final volume in said cell, to select the minimum compression ratio for the optimum utilization of the fuels which are most sensitive to detonation.

The operation between the charge collector, the scavenging collector and the communicating passage therebetween may be varied as follows:

*First case.*—If the communication between both collectors is continuous, the throttle being fully opened, the charging collector is maintained at the same static pressure as the scavenging collector.

*Second case.*—If the communication between both collectors is tightly sealed, the cells will be successively charged from the scavenging collector, but much sooner than previously, the end of air induction in this case occurring at the point of closure of the scavenging air inlet aperture. As the cells continue to rotate, and their volume decreases, the cells will successively charge the charging collector and will maintain the pressure thereof at a limiting value equal to the pressure obtained in each cell, at the precise point where communication is cut off between the cell and the charging collector, account being taken of the initial scavenging pressure to allow the maximum total volume generated in each cell to be filled at atmospheric pressure.

In the first case, the engine will operate in under-fed condition and at the minimum compression rate, the mass of charging air which is to be burnt being substantially reduced to half.

In the second case, the engine will operate at full intake, with a final effective compression rate which is higher, since upon closure of the charging aperture (start of the compression phase in the cell which has just been supplied) the effective air pressure is almost double that which prevails at the same point in the first above-described case.

This engine is therefore provided with a variable and adjustable compression rate. Adjustment of the effective compression rate is obtained by operating and regulating the auxiliary throttle to open or seal the communication passage between the charge collector and the scavenging air collector, thus varying the pressure in the charge collector and thereby accurately determining the final air intake pressure into the operating cells.

The engine is provided with a high expansion ratio. In the first above indicated case, wherein the engine is underfed (half cylinder capacity), the expansion in the cell lasts until establishment of the maximum volume therein. The engine then operates in low compression rate, extended expansion and limited power output characteristics, with detonation sensitive fuels. In the second case, wherein the engine is fed at full capacity, the engine operates at an average compression rate and a normal power output, with fuels less sensitive to detonation. The expansion ratio is the same as in the first case.

If, the charge and scavenging collectors are isolated from each other and the charge compressor is operated to further raise the pressure in the charge collector to a predetermined value, the engine is supercharged and will then operate at a higher compression rate, at its maximum power output, with fuels which are inherently more refractory to detonation or which have been rendered so. The expansion ratio still remains the same.

The output of the fuel distributor (such as a metering pump or the like) may be adjusted manually or automatically: (1) as a function of the final intake pressure as determined in the biasing and charging collector; (2) by providing an additional collection effected as a function of the final intake pressure so as to maintain a constant richness value in the detonating mixture independently of the power output of the engine.

Engines of large dimensions (such as industrial or marine engines) having a slower rate of operation, may operate with solid fuel used in the form of a very fine and dry powder (such as pulverised coal or combustible flour) more efficiently than do engines known in prior art, for the following reasons:

1. The powdered fuel distributing devices operate continuously, which facilitates the adjustment of the fuel composition.

2. There is no sealing element interposed between the pulverising devices and the operating chambers other than the rotor blades. Introduction of the charge of pulverised fuel is effected at the start of the effective compression phase in the cell and interrupted well in advance of the end of the compression phase, by the rotation of the rotor blades themselves.

3. Friction is minimized between the rotor and stator of the engine to eliminate the risk of binding.

4. The use of self-lubricating movable members (graphitized parts) does away with liquid lubricant in the operating chambers and the side walls thereof and avoids the formation of an abrasive emulsion.

5. The violent blast of compressed air acting as a seal, discharged through the very small clearances in the movable assemblies, prevents any penetration of dust or powdered fuel into the inner space of the mechanical members.

6. The absence of any distributing member in the operating chambers eliminates any objectionable defect in gas-tightness, which could result in creating super-heated zone which could effect a premature ignition of the detonating charge mixture.

7. The final compression pressure value being controlled and adjusted at the value barely necessary to produce the temperature of spontaneous ignition in the charge at the end of the compression stroke, the risk of premature ignition at the wrong moment is also eliminated.

8. The violent stream of fresh scavenging air prevents accumulation of non-burnt powder in the operating cells, and the creation of a super-heated zone.

The volumetric rotary machines of the invention is particularly designed for high speed operation, at a constant rate.

In the larger size machines, it is possible to superimpose two concentrical runways for the annular partition, one being provided with balls and the other with rollers, with one or several parallel rows of anti-friction elements to maintain within reasonable limits the speed of rotation of the individual balls or rollers, and the centrifugal action exerted on their own mass.

Machines of any power output and any size may be constructed. It is thus possible to construct low or high pressure compressors both in single-stage or two-stage types, vacuum pumps, compressed air engines, superheated steam engines and internal combustion engines with a long expansion phase and highly smooth operation.

The relatively lightweight construction of such machines provides an economy in raw materials.

The nature of the metals used in the construction thereof are selected for each individual case. It is possible to provide protection against oxidizing or corrosion of the metallic surfaces directly in contact with the circulating gases or vapours by a suitable chemical treatment or an electrolytic coating (such as a chromium coating for instance) and a high polish of said surface. The friction surfaces are carefully polished and may be graphitized by conventional methods.

It will of course be understood that modifications may be made in the details of construction and the relative proportions and arrangements of the various constituent elements of my improved machines as described above without exceeding the scope of the invention as defined in the ensuing claims.

I claim:

1. In a rotary volumetric machine, the combination comprising a rotor constituted by the rigid assemblage of a central partially spherical core, of a shaft going through said core, of more than two radial blades with curved edges concentric with said core, and of frusto-conical flanges on the side of said core, a stator enclosing said rotor in fluid tight relation, a rotating annular oblique partition in fluid tight contact with said core dividing said stator into two compartments, guiding means for the periphery of said partition in said stator, openings through the same partition with fluid tight pivoting elements for the passage of said blades, said pivoting fluid tight elements being pivoted in members which are rigidly bound to said partition only for two of the blades which are situated on the same diameter of said rotor, but are angularly movable to and fro up to a predetermined extent about the center of said partition, and inlet and outlet passages for a fluid for each compartment of the stator.

2. In a rotary volumetric machine, the combination comprising a rotor constituted by the rigid assemblage of a central partially spherical core, of a shaft going through said core, of more than two radial blades with curved edges concentric to said core and of frusto-conical flanges on the sides of said core, a stator enclosing said rotor in fluid tight relation, a rotary oblique annular hollow partition dividing said stator into two compartments, guiding means for the periphery of said hollow partition in the stator, openings in said partition with fluid tight pivoting elements for the passage of said blades, said pivoting fluid tight elements being pivoted in blocks located in said hollow partition, means for bonding to the same partition two of said blocks situated on a same diameter of said rotor, whereas the other blocks are free to slide angularly to and fro up to a predetermined extent about the center of said partition, and inlet and outlet passages for a fluid for each of said compartments of the stator.

3. A machine according to claim 2, in which said hollow rotating annular oblique partition consists of two flanges bound together by their external edges.

4. In a machine according to claim 2, means for producing compressed air, channels for leading the compressed air about the periphery of said hollow rotating annular partition and channels for leading the compressed air on one hand between said movable blocks and the internal wall of said hollow rotating partition and on the other hand between all said blocks and the fluid tight pivoting elements.

5. In a machine according to claim 1, passage means between the exit of fluid at one side of the annular partition and the entrance of fluid at the other side of said partition and means for cooling the fluid between these two points.

6. In a machine according to claim 1, labyrinthian joints at each side of said rotor, means for compressing air, and channels for admitting said compressed air to said labyrinthian joints.

7. In a machine according to claim 1 with said fluid tight elements made of self lubricating metal, means for compressing air and channels for admitting said compressed air to said pivoting fluid tight elements.

8. In a machine according to claim 1, the provision of a number of said blades as great as will allow the necessary place for said fluid tight pivoting elements and the displacement of those which are movable about the center of said rotating annular oblique partition.

9. In a machine according to claim 1, double side walls for the said two compartments of the stator, inlet and outlet means for a thermal exchange fluid for each of said compartments, said inlet and outlet in one compartment being displaced through 180° with respect to said inlet and outlet in said other compartment.

10. In a machine according to claim 1, a circular aileron on each face of said annular rotating partition with an inner contour conforming to the inner surface of said stator.

11. In an internal combustion engine according to claim 1, means for dividing the exhaust phase into two portions, means for using the energy of the burnt gases evacuated during the first portion in order to accelerate the flow of scavenging air, means for evacuating the remainder of the burnt gases with the scavenging air during the second portion of the exhaust phase.

12. In an internal combustion engine, as in claim 1, a charge biasing collector arranged in said stator, means for supplying said collector with compressed air, and means to vary the pressure of said air in said collector.

13. In an internal combustion engine as in claim 1, a charge biasing collector in said stator, means for supplying said collector with a compressed charge of detonating mixture, and means to vary the pressure of said mixture in said collector.

FRANÇOIS ROCHEFORT.

REFERENCES CITED

The following references are of record in the file of this patent:

UNITED STATES PATENTS

| Number | Name | Date |
|---|---|---|
| 969,353 | Evans | Sept. 6, 1910 |
| 1,255,403 | Gardner et al. | Feb. 5, 1918 |
| 2,070,138 | Martin | Feb. 9, 1937 |
| 2,401,376 | Sherman | June 4, 1946 |
| 2,418,081 | Mann | Mar. 25, 1947 |

FOREIGN PATENTS

| Number | Country | Date |
|---|---|---|
| 495,064 | Great Britain | Nov. 7, 1938 |